(12) United States Patent
Johansson et al.

(10) Patent No.: US 12,741,323 B2
(45) Date of Patent: Sep. 22, 2026

(54) METAL CUTTING TURNING TOOL

(71) Applicant: AB SANDVIK COROMANT, Sandviken (SE)

(72) Inventors: Adam Johansson, Sandviken (SE); Krister Wikblad, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 369 days.

(21) Appl. No.: 18/561,767

(22) PCT Filed: Dec. 14, 2021

(86) PCT No.: PCT/EP2021/085696
§ 371 (c)(1),
(2) Date: Nov. 17, 2023

(87) PCT Pub. No.: WO2022/242893
PCT Pub. Date: Nov. 24, 2022

(65) Prior Publication Data

US 2024/0238876 A1 Jul. 18, 2024

(30) Foreign Application Priority Data

May 20, 2021 (EP) .................................... 21174952

(51) Int. Cl.
*B23B 27/16* (2006.01)

(52) U.S. Cl.
CPC .. *B23B 27/1677* (2013.01); *B23B 2200/0452* (2013.01); *B23B 2205/16* (2013.01)

(58) Field of Classification Search
CPC ........... B23B 27/1622; B23B 27/1614; B23B 27/164; B23B 27/1625; B23B 27/1651;
(Continued)

(56) References Cited

U.S. PATENT DOCUMENTS 3,777,341 A * 12/1973 Faber ................. B23B 27/1614 407/101
4,533,283 A 8/1985 Satran et al.
(Continued)

FOREIGN PATENT DOCUMENTS

EP 0983814 A2 3/2000
EP 1226890 A1 7/2002
(Continued)

*Primary Examiner* — Sarang Afzali
*Assistant Examiner* — Darrell C Ford
(74) *Attorney, Agent, or Firm* — Corinne R. Gorski

(57) ABSTRACT

A turning tool includes a turning insert and a tool body. The turning insert has opposite facing top and bottom surfaces connected by a circumferential side surface. The turning tool has a pocket arranged for receiving the turning insert. The pocket includes a bottom support surface and first and second pocket side surfaces, the first and second pocket side surfaces forming an acute angle. The first pocket side surface includes first and second side support surfaces and the second pocket side surface includes third and fourth side support surfaces. The first recess is formed between the first and second side support surfaces and the second recess is formed between the third and fourth side support surfaces. Each recess forms a gap between the circumferential side surface and the respective pocket side surfaces.

11 Claims, 10 Drawing Sheets

(58) Field of Classification Search
CPC ............ B23B 27/1644; B23B 27/1659; B23B 27/1662; B23B 27/1666; B23B 27/1677; B23B 27/1611; B23B 27/1603
See application file for complete search history.

(56) References Cited

U.S. PATENT DOCUMENTS

| | | | | |
|---|---|---|---|---|
| 5,921,721 | A * | 7/1999 | Hintze | B23B 27/1622 407/113 |
| 6,769,843 | B2 * | 8/2004 | Hansson | B23B 27/00 407/104 |
| 7,001,115 | B2 * | 2/2006 | Erickson | B23B 27/1614 407/103 |
| 11,396,049 | B2 * | 7/2022 | Akbari | B23B 29/04 |
| 2007/0231089 | A1 * | 10/2007 | Hecht | B23B 27/04 407/113 |
| 2007/0245866 | A1 * | 10/2007 | Wickman | B23B 27/065 407/119 |
| 2008/0292415 | A1 * | 11/2008 | Kuroda | B23B 27/145 83/53 |
| 2010/0189521 | A1 * | 7/2010 | Shaheen | B23B 27/1614 407/103 |
| 2013/0236255 | A1 * | 9/2013 | Hecht | B23B 27/1622 407/103 |
| 2016/0368062 | A1 * | 12/2016 | Hen | B23B 27/1622 |

FOREIGN PATENT DOCUMENTS

| | | | |
|---|---|---|---|
| EP | 3153261 | A1 | 4/2017 |
| WO | 2019086218 | A1 | 5/2019 |

* cited by examiner

A2
25
1
R4
R3
18
3
b
2
17
A
R1
R2

13
18
16
27
14
C
11
22
B
26
23

2
D2
15
21
D
29
12
17
28

Fig. 7
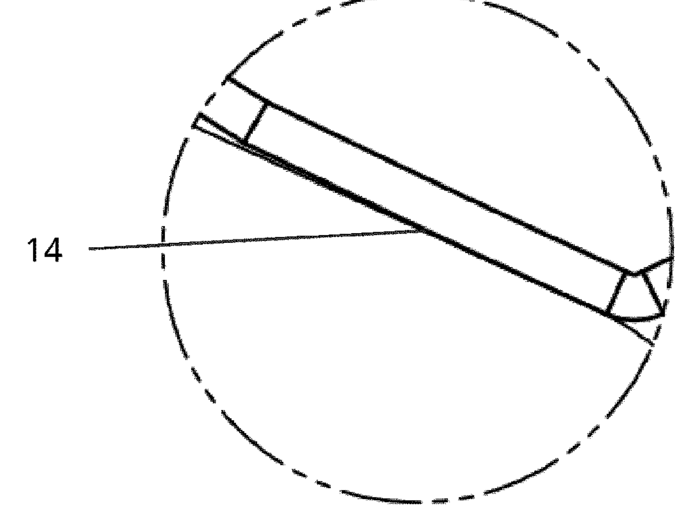
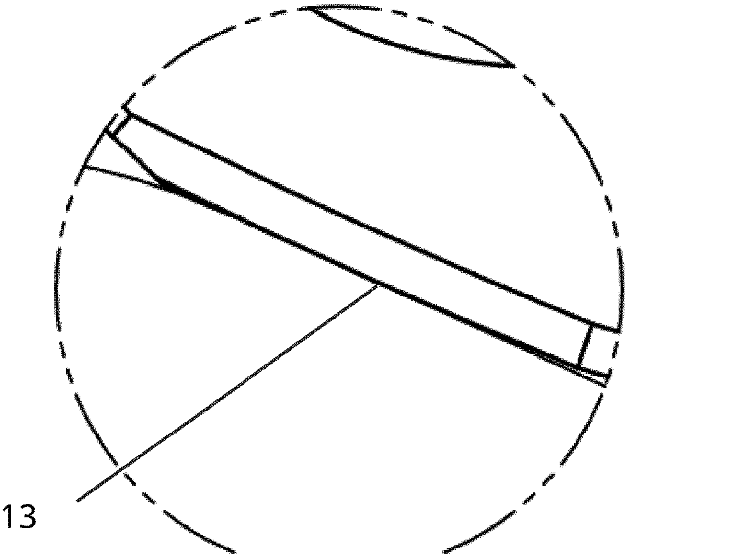
Fig. 8
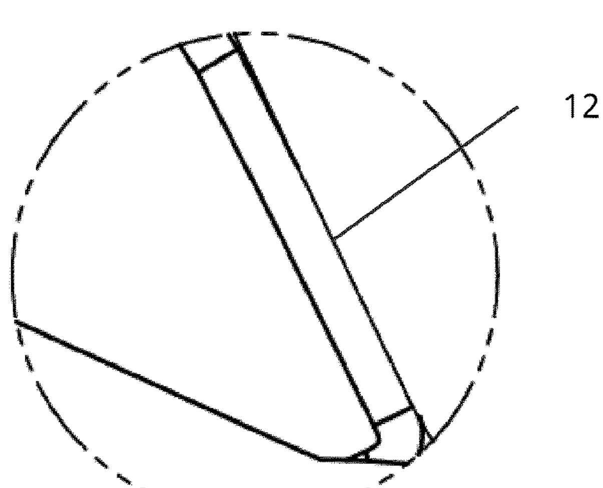
Fig. 9

A2

25
3
10
7
9
γ
15
11
3
25
12
7
A2

A2
25
R4
R3
13
11
14
A
R1
R2
12
C
B
14
16
D
13
12
15
11

14

13
12

Fig. 19
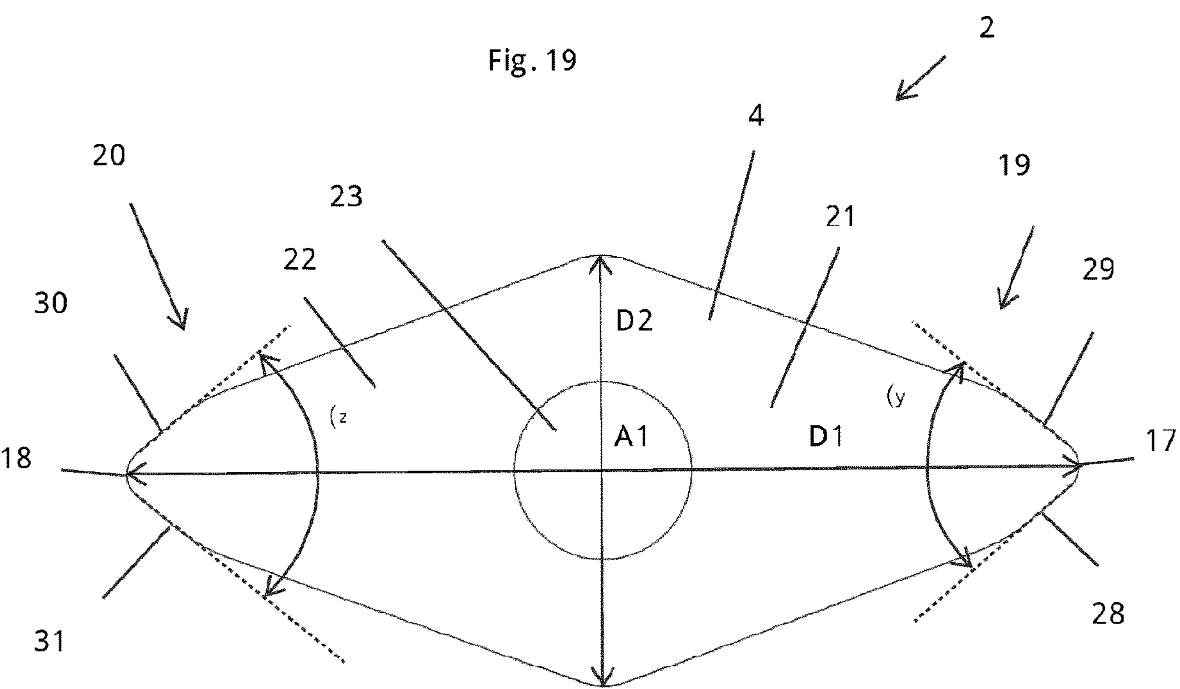
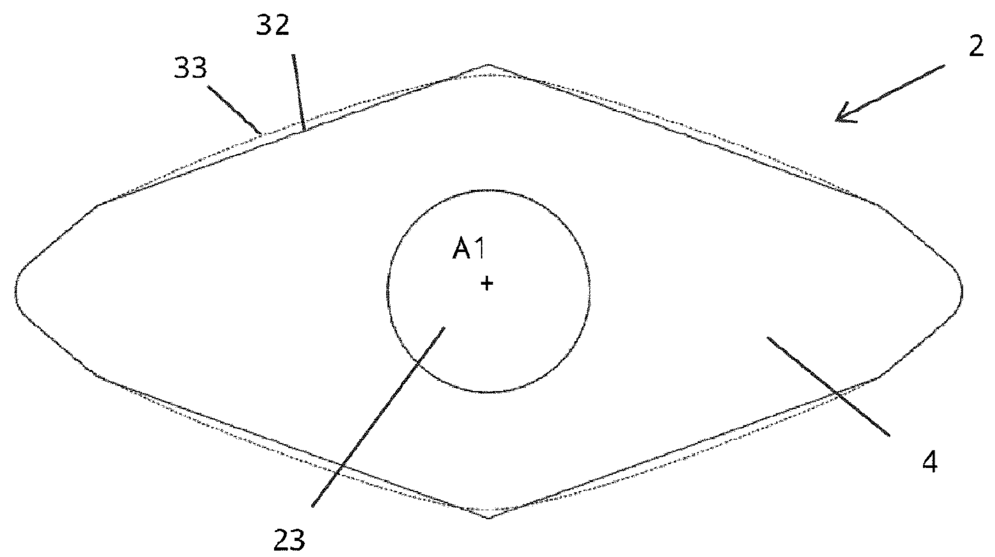
Fig. 20

METAL CUTTING TURNING TOOL

RELATED APPLICATION DATA

This application is a § 371 National Stage Application of PCT International Application No. PCT/EP2021/085696 filed Dec. 14, 2021.

TECHNICAL FIELD OF THE INVENTION

The present invention belongs to the technical field of metal cutting. More specifically the present invention belongs to the field of turning.

BACKGROUND OF THE INVENTION AND PRIOR ART

The present invention refers to a turning tool according to the preamble of claim 1. In other words, the present invention relates to a turning tool comprising a turning insert and a tool body, the turning insert comprises opposite facing top and bottom surfaces connected by a circumferential side surface, the turning tool comprising a pocket for the turning insert, the pocket comprises a bottom support surface and first and second pocket side surfaces, the first and second pocket side surfaces forms an acute angle.

In metal cutting, turning is a common operation. CNC-lathes are commonly used. Normally, a complex shaped is machined from a metal work piece. Turning operations are conventionally carried out by using a plurality of turning tools for turning in different feed directions, such as longitudinal turning in opposite directions or facing and out-facing. For example, when turning a 90 degree corner the conventional approach has been to use at least two different turning tools.

EP 3 153 261 A1 disclose a turning tool which aims to overcome the above described drawbacks, while also reducing the insert wear.

The inventors have found that the state of the art has some drawbacks, and that there is a need for a further improved turning tool.

Especially, the inventors have found that a disadvantage with the turning tool disclosed in EP 3 153 261 A1 is that the cutting depth possibility is limited in out-facing.

SUMMARY OF THE INVENTION

An object is to provide an improved turning tool, which to a greater extent is useable in a plurality of feed directions. A further object is to provide a turning tool which can be used to machine with high accuracy. A still further object is to provide a turning tool which comprises a turning insert which can be manufactured in an economical way.

At least one of said objectives is achieved by the initially defined turning tool, where the first pocket side surface comprises first and second side support surfaces, in that the second pocket side surface comprises third and fourth side support surfaces, in that a first recess is formed between the first and second side support surfaces, in that a second recess is formed between the third and fourth side support surfaces. and in that each recess forms a gap between the circumferential side surface and the respective pocket side surfaces.

By such a turning tool, machined surface can be machined with greater accuracy, due to less insert movement and greater insert positional accuracy, especially when using turning inserts made by pressing and sintering when turning in a plurality of feed directions. Turning inserts made through pressing and sintering where side contact surfaces or side support surfaces have not been subject to grinding or similar time consuming processes have been found to increases the risk of deformation in shape, especially a deformation which makes the insert more convex. Deformation in this sense means a shape which deviates from the ideal shape. This increases the risk bending of the turning, even cracking of the turning insert, if the distance from the surface generating point of the cutting edge to the side support surface which is in contact with the pocket side surface is too great.

The turning tool is for a CNC-lathe i.e. a computer- or computerized numerical control lathe, i.e. any CNC-machine suitable for turning such as e.g. a turning lathe, a multitask machine, a turn-mill machine, or a sliding head machine. The turning tool is for machining a metal work piece, such as a metal work piece comprises an external surface, which is a radially outer surface, where the radially outer surface is facing away from a rotational axis around which the metal work piece is rotatable. The turning tool is for turning of said radially outer surface, i.e. external turning. Alternatively, the turning tool may be for internal turning.

The turning tool comprises a forward end and an opposite rear end in the form of a coupling portion. The coupling portion is removably connectable to the CNC-lathe, more specifically to a machine interface of the CNC-lathe, such as a machine spindle or a tool revolver turret or a tool post.

The coupling portion may have a square or rectangular shape in a cross section. The coupling portion may be conical or substantially conical such as preferably according to ISO standard 26623-1.

The coupling portion extends along a coupling axis or a center axis, which center axis defines a longitudinal axis of the turning tool.

The turning insert is made from a wear resistant material, such as cemented carbide. The tool body is preferably made from steel. The top surface of the turning insert is suitable to function as a rake face and may comprise chip breaking means such as protrusions and/or depressions to enhance chip breaking or chip control. The bottom surface comprises a contact surface or a seating surface, suitable to be in contact with the bottom surface of the pocket or insert seat. The top and bottom surfaces may be identical or substantially identical, such that the turning insert is reversable. The top and bottom surfaces are connected by a circumferential side surface, which functions as a clearance surface and as a contact surface or a seating surface, i.e. suitable to be in contact with the pocket side surfaces.

A cutting edge is formed at the border between the circumferential side surface and the top surface. Said cutting edge may be circumferential and comprises a plurality of edge portions.

The turning insert is polygon shaped in a top view. Preferably, the turning insert is of rhombic shape or substantially rhombic shape in top view. For example, the periphery of the turning insert may in a top view comprise a plurality of linear segments. If the longest of said linear segments form a rhombic shape, then the turning insert can be considered to have a rhombic shape or substantially rhombic shape.

The turning tool comprising a pocket or insert seat for the turning insert. The pocket comprises a bottom support surface for contact with the bottom surface of the turning insert and first and second pocket side surfaces for contact with the circumferential side surface.

The first and second pocket side surfaces forms an acute angle in a top view.

A first imaginary plane touching the first and second side support surfaces forms an acute angle with a second imaginary plane touching the third and fourth side support surfaces.

The first pocket side surface comprises first and second side support surfaces or contact surfaces, which protrudes towards the turning insert.

The second pocket side surface comprises third and fourth side support surfaces or contact surfaces, which protrudes towards the turning insert.

A first recess is formed between the first and second side support surfaces. The first recess is in the form of a concave portion in a top view.

A second recess is formed between the third and fourth side support surfaces. The second recess is in the form of a concave portion in a top view.

Each recess forms a gap between the circumferential side surface and the respective pocket side surface which faces the recess.

Thus, the circumferential side surface is spaced apart from the respective pocket side surface.

The circumferential side surface is in contact with at least three of the four side support surfaces.

The turning tool preferably comprises clamping means for retaining the turning insert in the pocket, such as e.g. an insert screw or a top clamp.

According to an embodiment, at least two of the side support surfaces are convex.

By such a turning tool, deformation of the side support surfaces increases more slowly, especially if the turning insert is slightly convex. By such a turning tool, there is less risk of insert movement, especially if the side contact surfaces of the turning insert are slightly convex in shape.

At least two, preferably three, even more preferably four of the side support surfaces are convex in a top view.

The length of each side support surface is preferably 2-4 mm.

According to an embodiment, the turning insert is 180° symmetrical or indexable in relation to a central axis thereof, wherein the center axis intersects the top and bottom surfaces, wherein the turning insert comprises two opposite nose cutting edges, wherein in a top view the turning insert extends a first distance between said nose cutting edges, and extends a second distance perpendicular to the first distance, wherein the first distance is greater than the second distance.

By such a turning tool, the turning insert is indexable and the service life is therefore prolonged.

In other words, in top view the turning insert is more elongated along an axis intersecting the nose cutting edges than in a direction perpendicular to said axis. The nose cutting edges are convex. Said distances intersects the center axis in a top view. Second distance is between two obtuse corners.

According to an embodiment, the turning tool comprises a coupling portion, wherein the coupling portion extends along a coupling axis, which coupling axis defines a longitudinal axis of the turning tool, wherein a line between the two opposite nose cutting edges forms an angle of 35-55° in relation to the coupling axis.

By such a turning tool, the turning insert is positioned or seated in such a way that a larger range of feed directions are possible, with relatively large cutting depth. Such a turning tool can be used in axial turning in opposite directions and in- and out-facing. Such a turning tool can be used in turning with a relatively low entering angle, less than 45°, which reduces insert wear.

In a top view, a line between the two opposite nose cutting edges forms an angle of 35-55°, more preferably 40-50° in relation to the coupling axis. A top view is where the top surface of the turning insert is facing the viewer. Said line is a bisector of the nose portion of the turning insert which is in an active position, i.e. a position where the first nose cutting edge can cut metal and generate a machined surface. The coupling axis is a longitudinal axis and extends from the front end of the turning tool to the rear end of the turning tool. The pocket or seat for the turning insert is formed in the front end. The rear end of the turning tool is in the form of a coupling portion. The coupling portion is removably connectable to the CNC-lathe, more specifically to a machine interface of the CNC-lathe, such as a machine spindle or a tool revolver turret or a tool post. The coupling portion may have a square or rectangular shape in a cross section. The coupling portion may be conical or substantially conical such as preferably according to ISO standard 26623-1.

According to an embodiment, a distance from the first pocket side surface to the coupling axis is shorter than a distance from the second pocket side surface to the coupling axis, wherein a distance from the coupling portion to the first side support surface is shorter than a distance from the coupling portion to the second side support surface, wherein a distance from the coupling portion to the third side support surface is shorter than a distance from the coupling portion to the fourth side support surface, wherein the third side support surface is in top view convexly curved by a radius of curvature which is smaller than the radius of curvature of the fourth side support surface.

By such a turning tool, the inventors have found that the performance of the turning tool is improved, considering both the rate of deformation of the side support surfaces, as well as the points or areas of contact especially if the side support surfaces of the turning insert are slightly convex. For example, the inventors have found that in longitudinal turning a more forward side support surface such as the fourth side support surface is more prone to plastic deformation, compared to a more rearward side support surface such as the third side support surface. Therefore, in order to avoid too high deformation of the fourth side support surface, the radius of curvature should be greater than the third side support surface. It is not necessary with a large radius of curvature for the third side support surface due to the relatively low deformation rate. A smaller radius of curvature ensure that the location of contact can be more predictable, and can be placed at a greater distance from the fourth side support surface, which decreases the risk of insert movement in the pocket, especially if the insert is slightly convex. The radius of curvature of the fourth side support surface is preferably 140-400% of the radius of the third side support surface. The radius of curvature of the fourth side support surface is preferably 60-200 mm, even more preferably 80-150 mm. The radius of curvature of the third side support surface is preferably 20-100 mm, even more preferably 40-60 mm.

Preferably, the third side support surface is in top view convexly curved by a radius of curvature which is smaller than the radius of curvature of the second side support surface.

The second side support surface is more forward than the first side support surface, where forward is away from the rear end of the turning tool, and closer to the nose cutting edge which is in an active position, i.e. in a position to cut metal. In a similar manner, the fourth side support surface is more forward than the third side support surface.

A distance from a mid-point of the first pocket side surface to the coupling axis is shorter than a distance from a mid-point of the second pocket side surface to the coupling axis.

A distance from the center axis to the first side support surface is smaller than a distance from the center axis to the second side support surface.

A distance from the center axis to the third side support surface is smaller than a distance from the center axis to the fourth side support surface.

The radius of curvature of the second side support surface is preferably 140-400% of the radius of the first side support surface. The radius of curvature of the second side support surface is preferably 60-200 mm, even more preferably 80-150 mm. The radius of curvature of the first side support surface is preferably 20-100 mm, even more preferably 40-60 mm. By such a turning tool, the risk of high deformation of the side support surfaces are sufficiently low, while at the same time the points or areas of contact can be sufficiently spaced apart to ensure good contact and low insert movement risk, especially for turning insert which have side support surfaces which are slightly convex.

According to an embodiment, the turning insert comprises first and second nose portions, wherein the first nose portion comprises the first nose cutting edge, wherein the second nose portion comprises the second nose cutting edge, wherein each nose portion forms an acute nose angle.

By such a turning tool, more complex shapes can be machined. By such a turning tool, more feed directions are possible, such as e.g. a 90° corner. The first nose angle is conventionally measured in a top view. A top view of the second cutting element is when the second rake face is facing the viewer. Preferably said first nose angle is 15-85°, even more preferably 25-83°. Preferably the second nose angle is equal to or substantially equal to the first nose angle. A first and a second cutting edge 28, 29 are connected by the first nose cutting edge. The angle between the first and second cutting edges define the first nose angle $\alpha$. In a corresponding manner, the second nose cutting edge 18 connects a third and a fourth cutting edge 30, 31, forming a second nose angle $\beta$.

According to an embodiment a line coinciding with the second distance divides the turning insert into a front half and a rear half, wherein only the circumferential side surface of the rear half of the turning insert is in contact with the tool body.

By such a turning tool, the possibility to machine in different directions with relatively high cutting depth is further improved.

Only portions of the circumferential side surface of the rear half of the turning insert is in contact with the tool body. In other words, the side support surfaces are only in contact with the rear half of the turning insert, not in contact with the front half of the turning insert. All cutting edges which are part of the front half of the turning insert are thus in an active position and can thus be used in turning.

The line which divides the front and rear halves are preferably drawn between two obtuse corners of the turning insert. Said two obtuse corners are the corners which are closest to the center axis of the turning insert.

The side surface of the front half of the turning insert is not facing the tool body.

According to an embodiment, the turning insert comprises a central bore, wherein the central bore opens into the top and bottom surfaces between the two opposite nose cutting edges, wherein the central bore is symmetrical around a center axis.

By such a turning tool, the turning insert can be clamped by either an insert screw or a top clamp. The central bore is suitable for clamping means in the form of a retaining insert screw.

According to an embodiment, in a top view a part of the central bore is between two side support surfaces.

By such a turning tool, the risk of insert movement is further reduced, because the forward support surfaces are closer to the active nose cutting edge.

The central bore is between the two side support surfaces closest to the nose cutting edge which is in an active position, more specifically the second and fourth side support surfaces. The nose cutting edge which is in an active position is the nose cutting edge which is most far away from a point where the first and second pocket side surfaces converge.

According to an embodiment each recess is concave in a top view, wherein the gap is 0.05-0.30 mm.

The maximum gap is 0.05-0.30 mm, measured in a direction perpendicular to the circumferential side surface of the turning insert. The maximum gap is preferably at a mid-point of the respective recess.

By such a turning tool, the insert support is proper while the risk of chips stuck in the gap is reduced.

According to an embodiment the parts of the circumferential side surface of the turning insert which are in contact with the side support surfaces are flat or substantially flat or are convex having a radius of curvature which is greater than 500 mm.

The parts of the circumferential side surface of the turning insert which are in contact with the side support surfaces are thus flat are slightly convex, having a radius of curvature which is greater than 500 mm, preferably greater than 2000 mm, even more preferably greater than 5000 mm. The turning insert is preferably made completely or to a large extent, i.e. more than 90 wt. % from cemented carbide. Said parts are not ground after pressing and sintering.

According to an embodiment the turning tool comprises a shim, wherein the shim comprises the bottom support surface of the pocket for the turning insert.

According to an embodiment a reference plane extends mid-way between the top and bottom surfaces, wherein a distance from the reference plane to the first nose cutting edge is shorter than a distance from the reference plane to a part of the top surface spaced apart from the circumferential side surface.

In other words, seen in a side view, at least a part of the top surface is higher than the first nose cutting edge. By such a turning insert, the chip breaking can be improved in turning, because an elevated or protruding portion formed on the top surface can function as a chip breaker or chip former.

According to an embodiment a distance from the reference plane to any cutting edge is shorter than a distance from the reference plane to a part of the top surface spaced apart from the circumferential side surface.

By such a turning tool, the chip breaking can be further improved. The tuning insert may be double-sided, such that the top and bottom surfaces comprises support surfaces. Said support surfaces are preferably flat and located in planes parallel to the reference plane. Said support surfaces are preferably spaced apart from the cutting edges. Said support surfaces are preferably spaced apart from the circumferential side surface.

DESCRIPTION OF THE DRAWINGS

The present invention will now be explained in more detail by a description of embodiments of the invention and by reference to the accompanying drawings.

FIG. 7 is a magnified view of section B in FIG. 6.

FIG. 8 is a magnified view of section C in FIG. 6.

FIG. 9 is a magnified view of section D in FIG. 6.

FIG. 19 is a top view of the turning insert in FIG. 1.

FIG. 20 is a top view of a turning insert.

FIG. 21 is a top view of a tool body according to a second embodiment.

DETAILED DESCRIPTION OF EMBODIMENTS OF THE INVENTION

Figure 1:
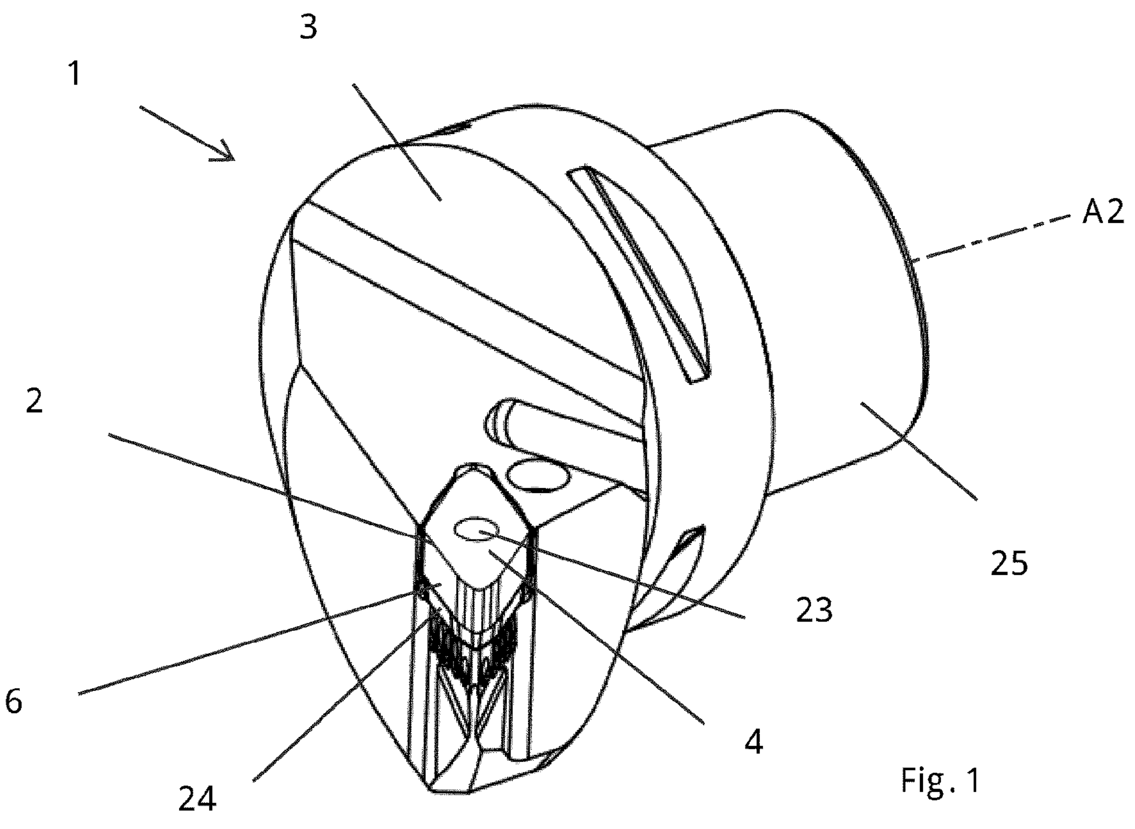
FIG. 1 is a perspective view of a turning tool according to a first embodiment.
Figure 2:
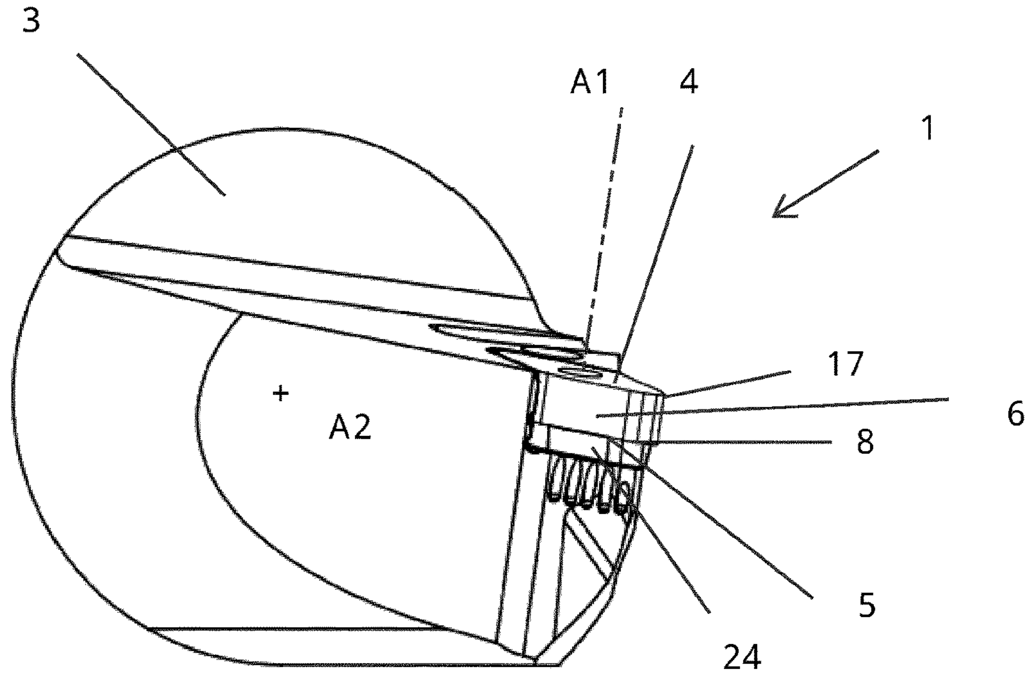
FIG. 2 is a front view of the turning tool in FIG. 1.
Figure 3:
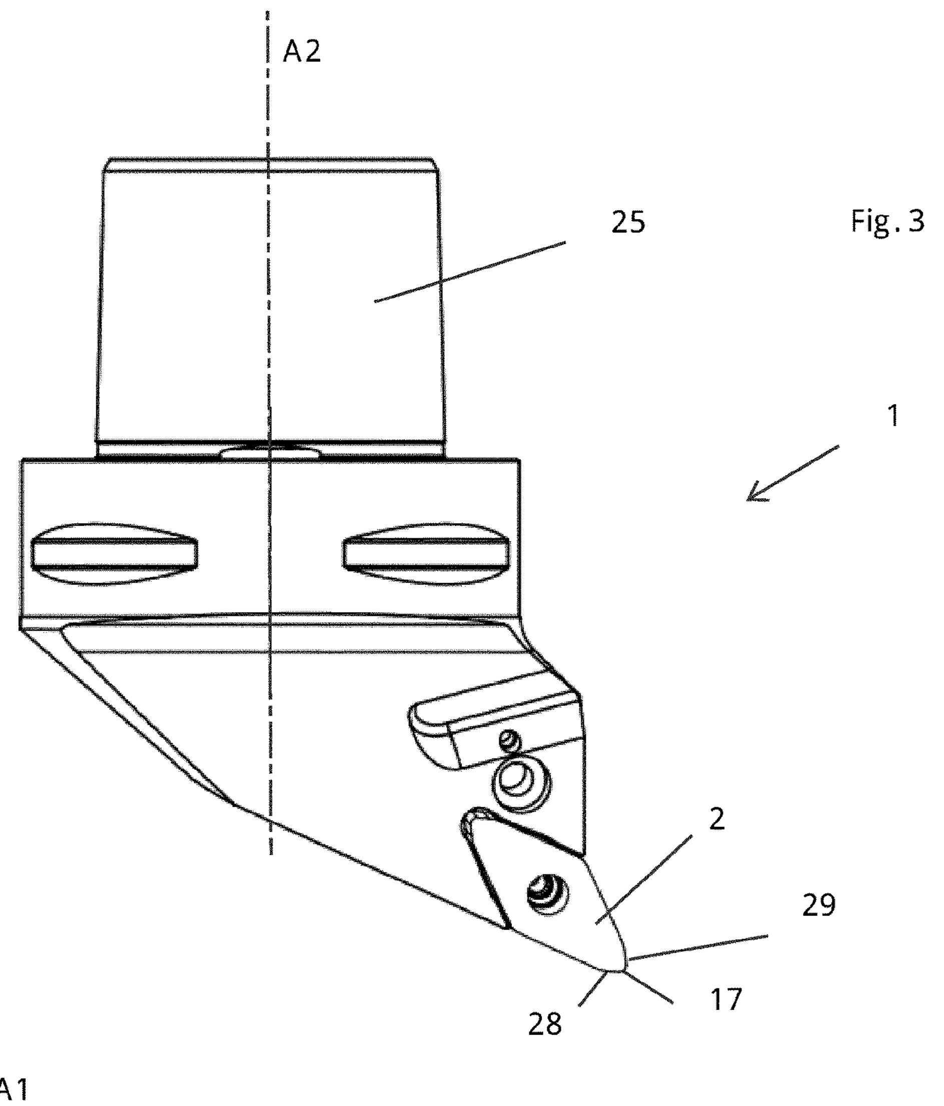
FIG. 3 is a top view of the turning tool in FIG. 1.
Figure 4:
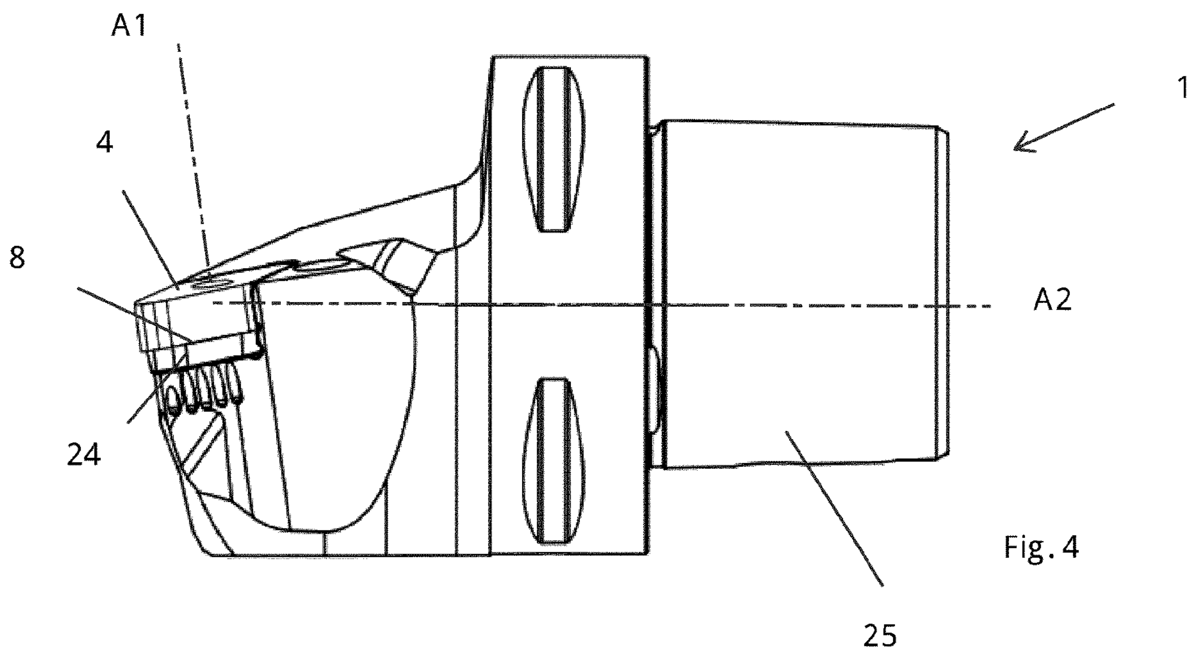
FIG. 4 is a side view of the turning tool in FIG. 1.

Reference is made to FIGS. 1-6 which show a turning tool 1 for machining a metal work piece (not shown) according to a first embodiment. The turning tool 1 according to the first embodiment comprises a tool body 3, a turning insert 2 and a shim 24. The turning tool 1 comprises a pocket for the turning insert 2. The turning insert 2 comprises opposite facing top and bottom surfaces 4, 5 connected by a circumferential side surface 6. The shim 24 comprises the bottom support surface 8 of the pocket for the turning insert 2. The turning tool 1 comprises a coupling portion 25 suitable to be connected to a machine interface of a CNC lathe (not shown). The coupling portion 25 extends along a coupling axis A2, which coupling axis A2 defines a longitudinal axis of the turning tool 1. The coupling portion 25 comprise a tapered or conical or substantially conical portion and a ring-shaped portion, in the form of a polygonal hollow taper interface with a flange contact surface, such in accordance to ISO 26623-1:2014, or a hollow taper with a flange contact surface such as e.g. in accordance to DIN 69893, ISO 12164-1 or ISO 12164-1F. The coupling portion may alternatively be square shaped (not shown) or rectangular shape (not shown) in a cross section perpendicular to the coupling axis.

Figure 5:
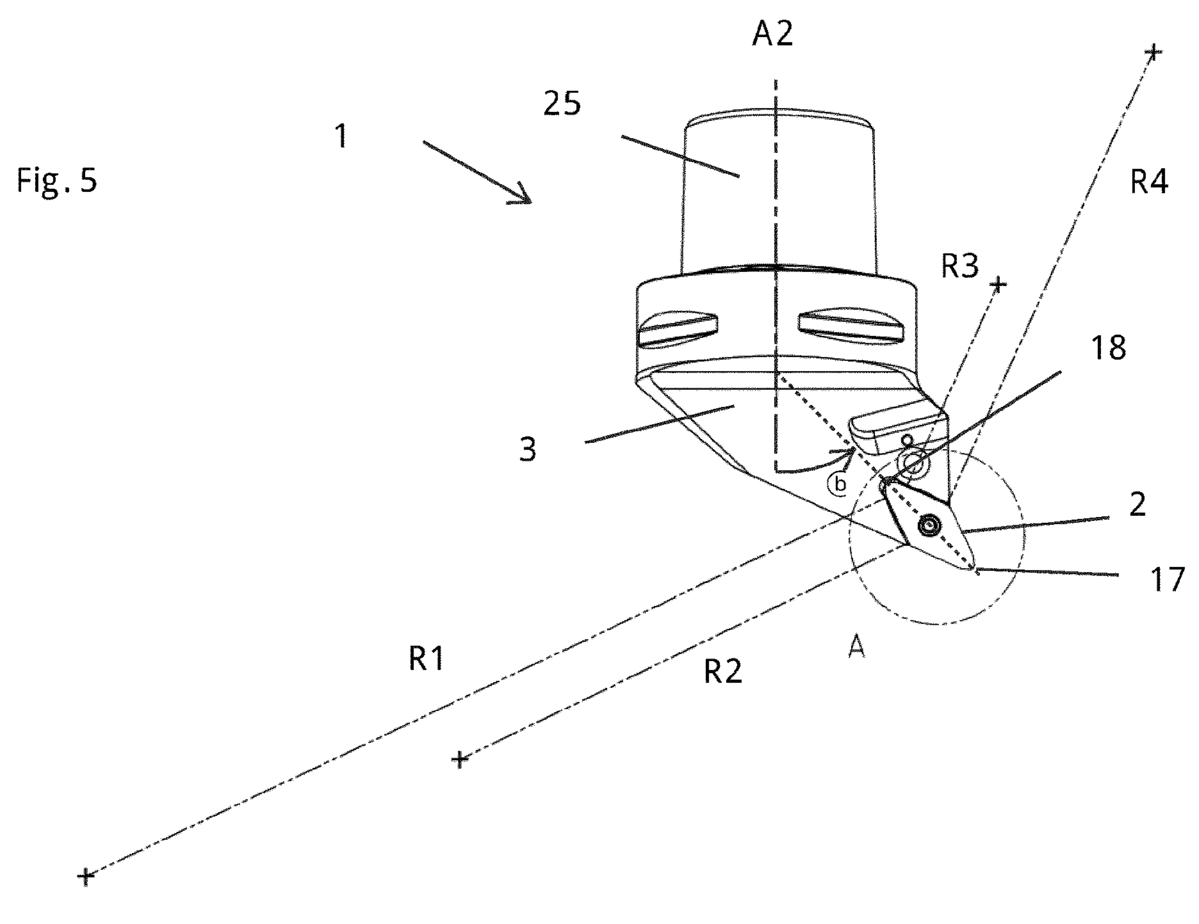
FIG. 5 is a top view of the turning tool in FIG. 1.

As seen in FIG. 5, the side support surfaces 11, 12; 13, 14 are convexly curved in top view, having respective radius of curvature R1, R2, R3 and R4. A line between the two opposite nose cutting edges 17, 18 forms an angle δ of around 45° in relation to the coupling axis A2.

Figure 6:
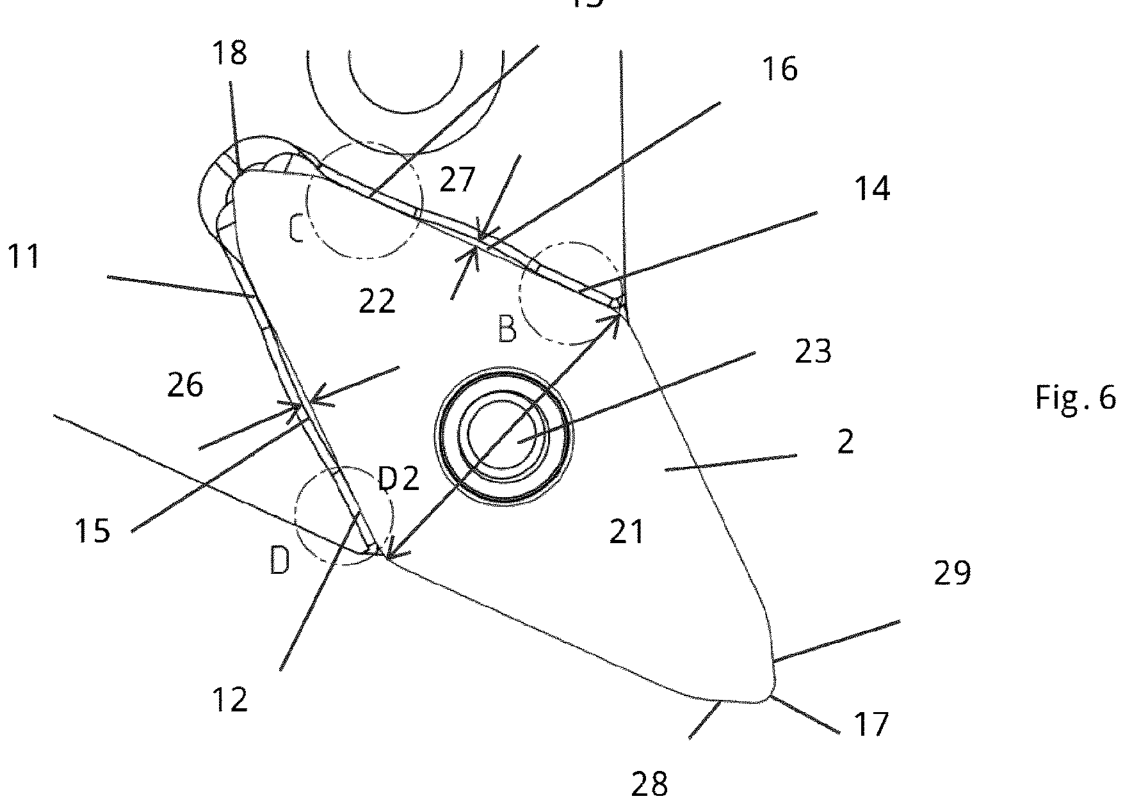
FIG. 6 is a magnified view of section A in FIG. 5.
Figure 10:
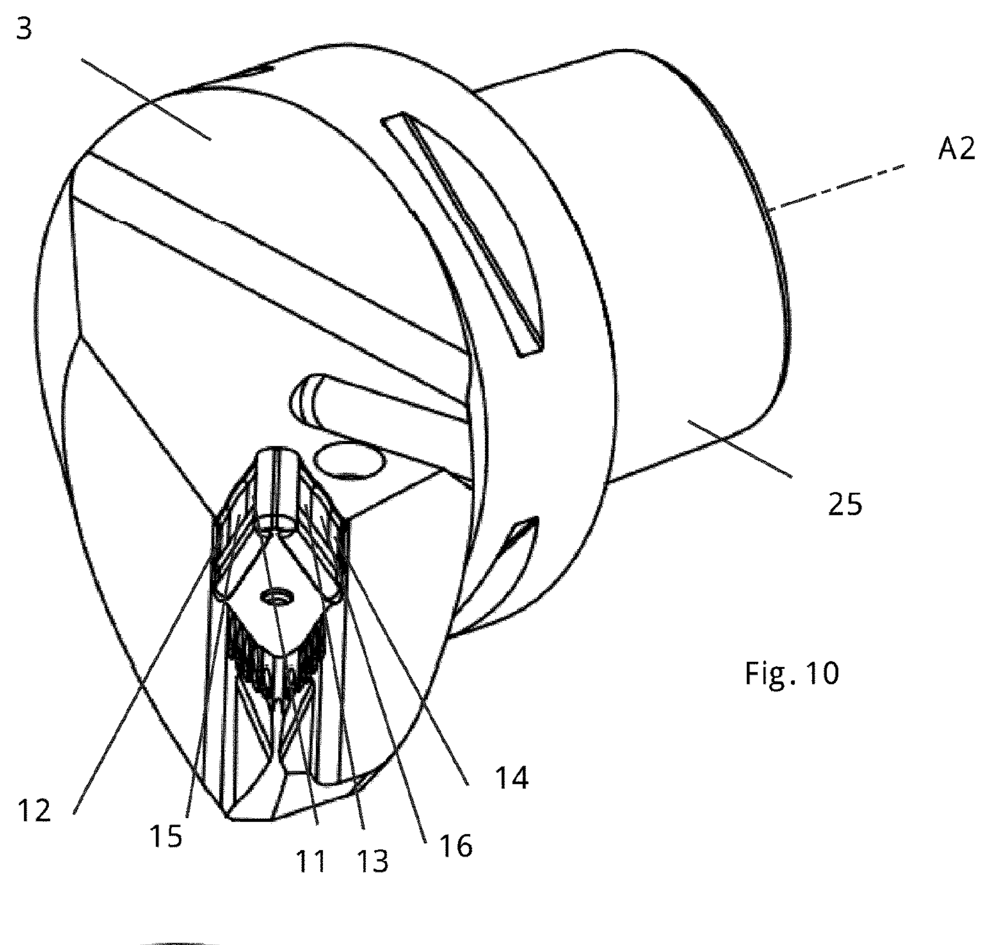
FIG. 10 is a perspective view of the tool body in FIG. 1.
Figure 11:
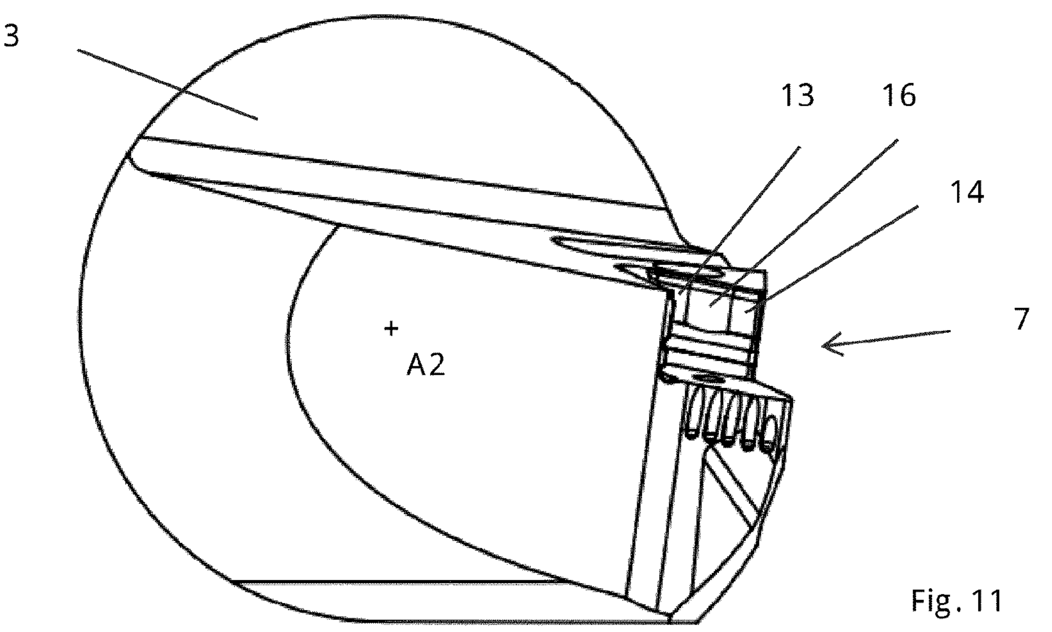
FIG. 11 is a front view of the turning tool in FIG. 10.

As seen in FIG. 6, the pocket comprises first, second, third and fourth side support surfaces 11, 12, 13, 14. A first recess or concavity 15 is formed between the first and second side support surfaces 11, 12. A second recess 16 or concavity is formed between the third and fourth side support surfaces 13, 14. Each recess 15; 16 forms a gap 26, 27 between the circumferential side surface and the respective pocket side surfaces 9, 10. The gap 26, 27 is 0.05-0.30 mm, measured perpendicular to the side support surface and to the central part of each recess 15, 16. The turning insert 2 is 180° symmetrical in relation to a central axis A1 thereof. The center axis A1 intersects the top and bottom surfaces 4, 5. As seen in FIG. 6, the turning insert 2 comprises two opposite nose cutting edges 17, 18. In a top view the turning insert 2 extends a first distance between said nose cutting edges 17, 18, and extends a second distance D2 perpendicular to the first distance, wherein the first distance is greater than the second distance D2. A line coinciding with the second distance D2 divides the turning insert 2 into a front half 21 and a rear half 22. Only the circumferential side surface 6 of the rear half 22 of the turning insert 2 is in contact with the tool body 3. The turning insert 2 comprises a central bore 23 which opens into the top surface 4 and bottom surface. A part of the central bore 23 is between two side support surfaces 12, 14.

FIG. 7 is a magnified image of section B in FIG. 6, where the convex forth side support surface 14 is shown, ensuring a contact near the obtuse corner of the turning thereby improving the stability.

FIG. 8 is a magnified image of section C in FIG. 6, where the convex third side support surface 13 is shown, ensuring a contact near the rear end of the turning insert thereby improving the stability.

FIG. 9 is a magnified image of section D in FIG. 6, where the convex second side support surface 12 is shown, ensuring a contact near the obtuse corner of the turning thereby improving the stability.

Figures 12, 13:
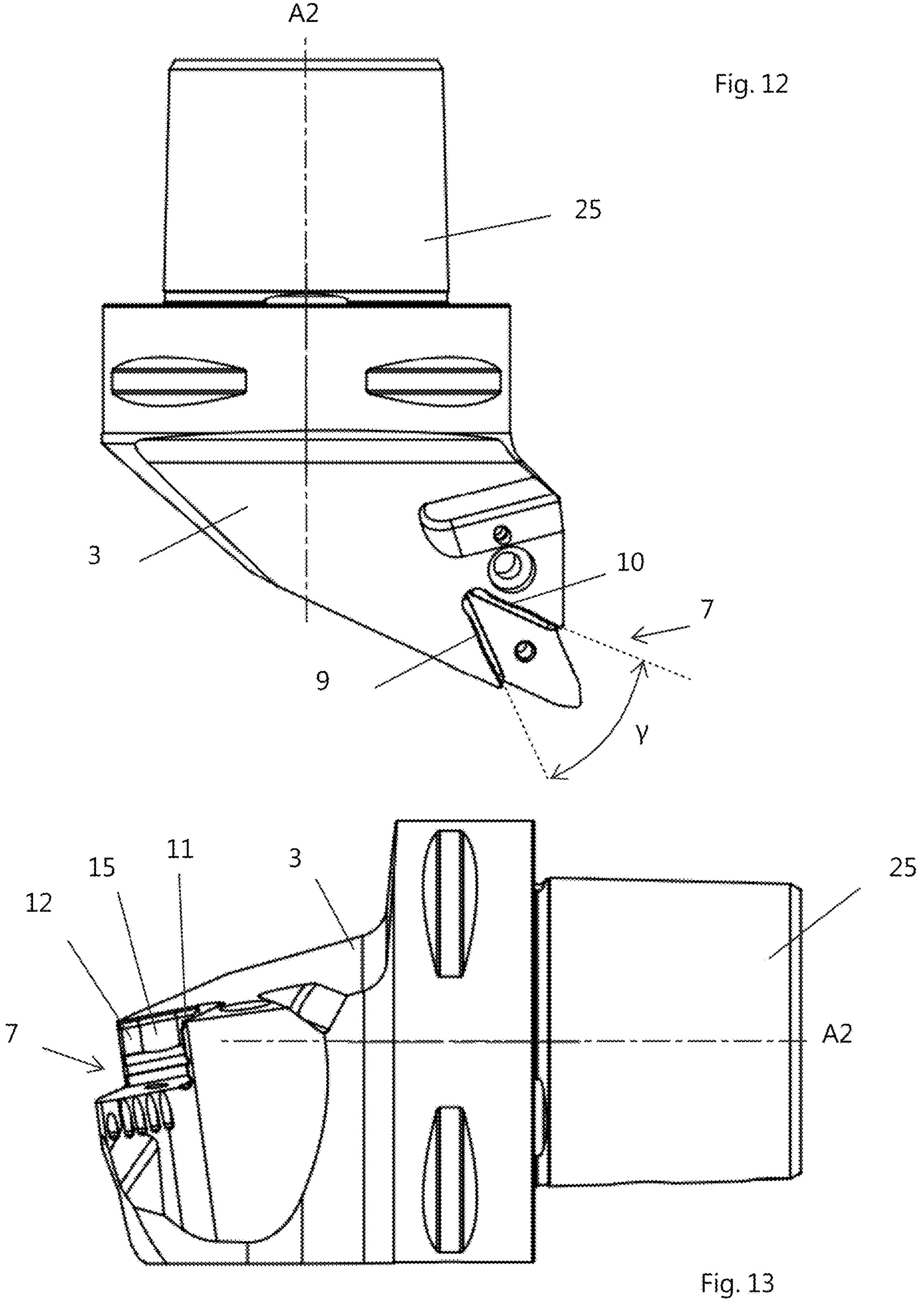
FIG. 12 is a top view of the turning tool in FIG. 1.
FIG. 13 is a side view of the turning tool in FIG. 1.

Reference is made to FIGS. 10-15, which show the tool body 3 of the above described turning tool 1. A pocket 7 for a turning insert comprises first and second pocket side surfaces 9, 10. As seen in FIG. 12, the first and second pocket side surfaces 9, 10 forms an acute angle γ. The first pocket side surface 9 comprises first and second side support surfaces 11, 12. The second pocket side surface 10 comprises third and fourth side support surfaces 13, 14. A first recess or concavity 15 is formed between the first and second side support surfaces 11, 12. A second recess 16 or concavity is formed between the third and fourth side support surfaces 13, 14. The shim and turning insert are not shown.

As seen in e.g. FIG. 12, a distance from the first pocket side surface 9 to the coupling axis A2 is shorter than a distance from the second pocket side surface 10 to the coupling axis A2.

FIG. 12 is a top view of a tool body 3, where the respective pocket side surfaces 9, 10 form an angle γ of around 55°. The dotted lines touches the respective side support surfaces.

FIG. 13 show a side view of the above described tool body 3. The insert seat or pocket 7 is shown without the shim, which shim form the bottom support surface of the pocket 7.

Figures 14, 15:
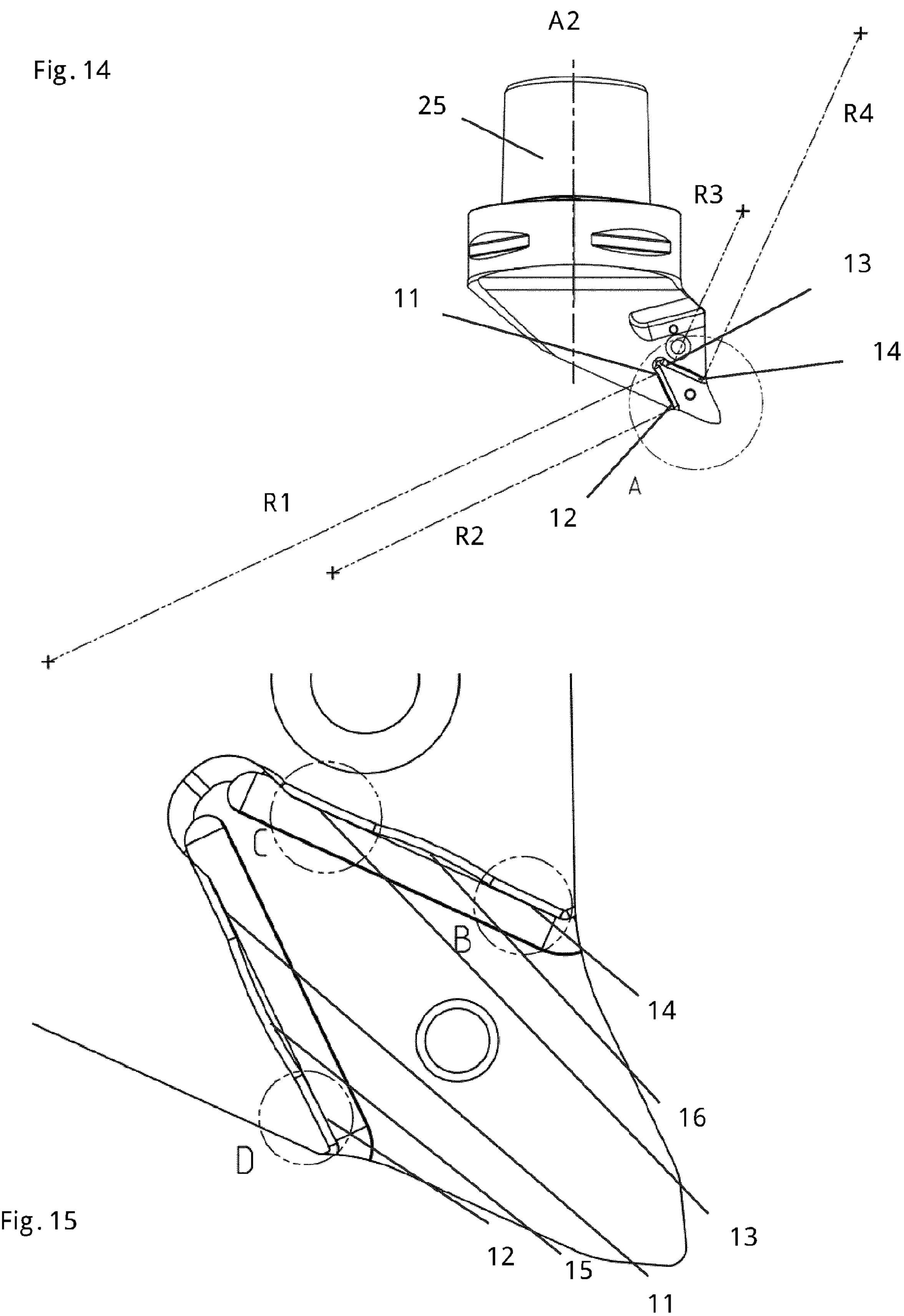
FIG. 14 is a top view of the turning tool in FIG. 1.
FIG. 15 is a magnified view of section A in FIG. 14.

FIG. 14 show how the side support surfaces 11, 12, 13, 14 are convexly curved, having a respective radii of curvature R1, R2, R3, R4. The third side support surface 13 is convexly curved by a radius of curvature R3 which is smaller than the radius of curvature R4 of the fourth side support surface 14, and smaller than the radius of curvature R2 of the second side support surface 12. A distance from the coupling portion 25 to the first side support surface 11 is shorter than a distance from the coupling portion 25 to the second side support surface 12. A distance from the coupling portion 25 to the third side support surface 13 is shorter than a distance from the coupling portion 25 to the fourth side support surface 14.

FIG. 15 is a magnified image of section A in FIG. 14. The convex side support surfaces 11, 12, 13, 14 are arranged for contact with opposite ends of the largest flat or near-flat portions of the circumferential side surface of the turning insert. Turning can be made towards the right-hand side as well as towards the left-hand side (with low entering angle). Turning can also be made upwards (out-facing) as well as downwards (facing).

Figures 16, 17, 18:
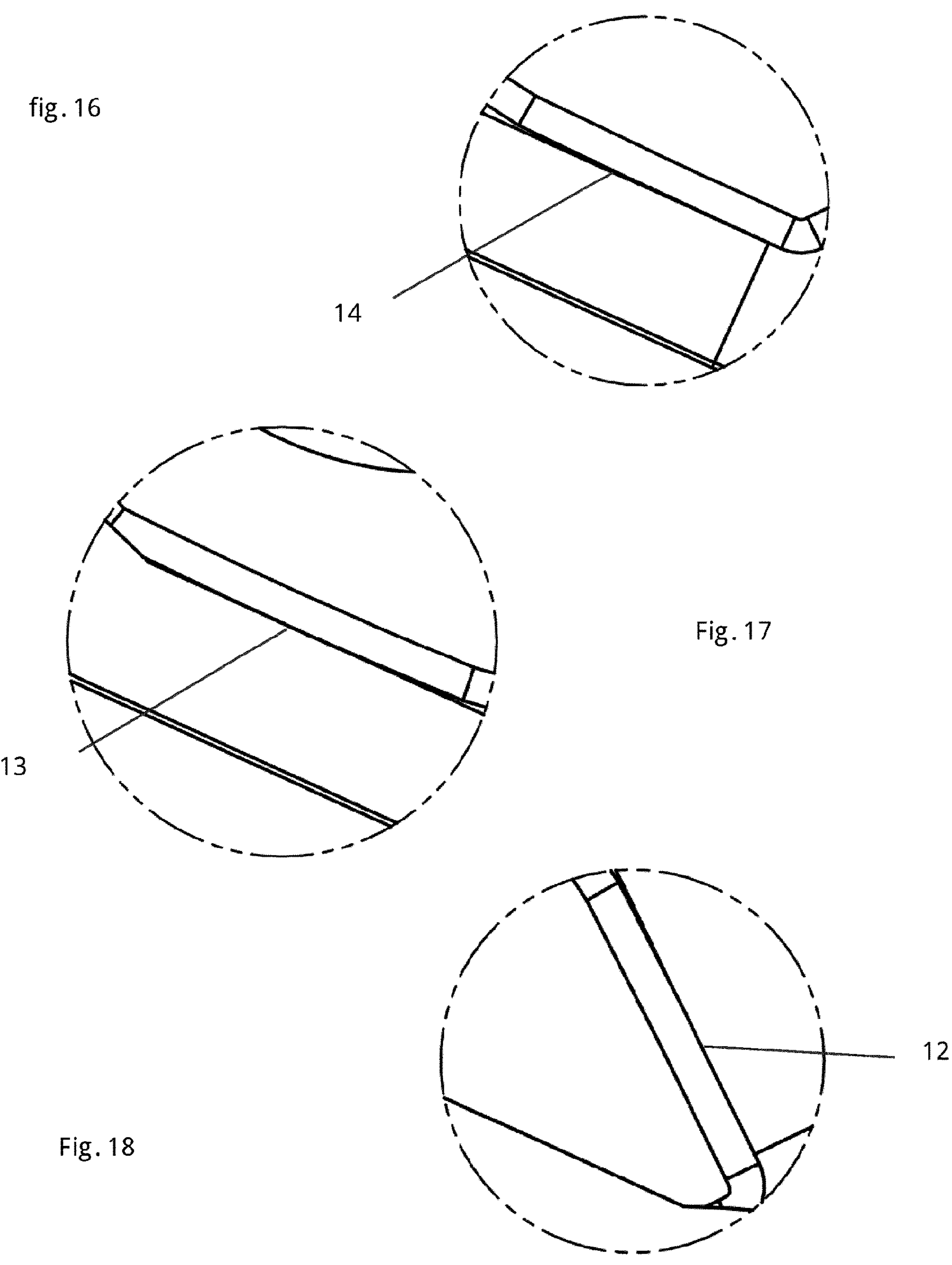
FIG. 16 is a magnified view of section B in FIG. 15.
FIG. 17 is a magnified view of section C in FIG. 15.
FIG. 18 is a magnified view of section D in FIG. 15.

FIG. 16 is a magnified image of section B in FIG. 15, where the convex forth side support surface 14 is shown, ensuring a contact near the obtuse corner of the turning thereby improving the stability.

FIG. 17 is a magnified image of section C in FIG. 15, where the convex third side support surface 13 is shown, ensuring a contact near the rear end of the turning insert thereby improving the stability.

FIG. 18 is a magnified image of section D in FIG. 15, where the convex second side support surface 12 is shown, ensuring a contact near the obtuse corner of the turning thereby improving the stability.

FIG. 19 shows a turning insert 2 which is part of the turning tool according to the first embodiment. The turning insert 2 comprises first and second nose portions 19, 20. The turning insert 2 comprises a central bore 23 which opens into the top surface 4 and bottom surface, between the two opposite nose cutting edges 17, 18. The central bore 23 is symmetrical around a center axis A1. The first nose portion 19 comprises the first nose cutting edge 17. The second nose portion 20 comprises the second nose cutting edge 18. A first and a second cutting edge 28, 29 are connected by the first nose cutting edge 17. The angle between the first and second cutting edges define the first nose angle α which is 80°. In a corresponding manner, the second nose cutting edge 18 connects a third and a fourth cutting edge 30, 31, forming a second nose angle β which is 80°. The periphery of the top surface 4 comprises a set of cutting edges 17, 18, 28, 29, 30, 31. The turning insert 2 is more elongated in a direction defined as a first distance D1 between the nose cutting edges 17, 18 than in a second distance D2, perpendicular to the first distance D1, where the second distance D2 is between two obtuse corners. By such an elongated and rhombic-like turning insert, the nose angles α, β can be acute, thereby improving the possibility for efficient turning in a plurality of directions.

FIG. 20 shows a turning insert 2 in a top view. The turning insert 2 comprises a central bore 23 coinciding with a center axis A1. The border or periphery of the top surface 4 of an ideal turning insert is designated 32. The ideal periphery comprises straight lines, resulting in flat surfaces which are in contact with the side support surfaces in the pocket. However, the inventors have found that after sintering and pressing, there is a risk that the shape of the turning insert 2 deviates from the ideal shape. More precisely, there is a risk that the border or periphery of the top surface is at least partly convex, as illustrated with periphery line 33. For illustration purposes, the convexity has been exaggerated. The convexity of the turning insert as illustrated by the periphery line 33 give rise to problems regarding insert support and contact surfaces, which have been overcome by convex side support surfaces spaced apart by a central concavity or recess.

FIG. 21 shows a tool body which is part of a turning tool according to a second embodiment. The only difference compared to the first embodiment is the respective radii of curvature R1, R2, R3, R4 of the convexly curved side support surfaces 11, 12, 13, 14. The third side support surface 13 is convexly curved by a radius of curvature R3 which is smaller than the radius of curvature R4 of the fourth side support surface 14, and smaller than the radius of curvature R2 of the second side support surface 12.

Figures 22, 23:
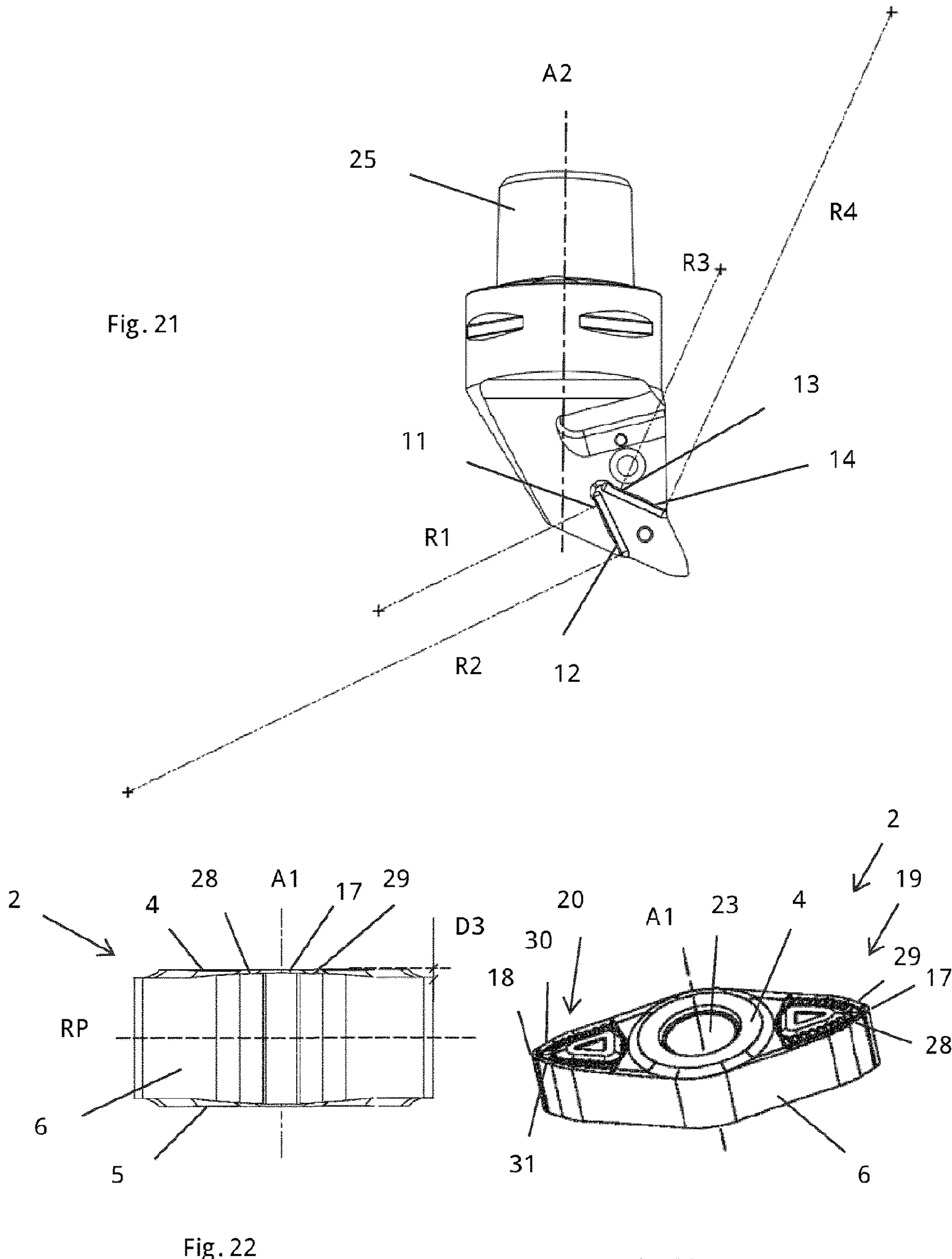
FIG. 22 is a front view of a turning insert.
FIG. 23 is a perspective view of the turning insert in FIG. 22.

The turning insert 2 preferably has a non-flat top surface 4, which is illustrated in FIGS. 22 and 23. The turning insert 2 shown in FIGS. 22 and 23 can be part of the turning tool according to the first or second embodiment and is double-sided or reversible, which means that the top and bottom surfaces 4, 5 are alternatively useable as rake surfaces and bottom support surfaces. The top and bottom surfaces 4, 5 are symmetrically or substantially symmetrically arranged relative to a reference plane or mid-plane RP, located midway between the top and bottom surfaces 4, 5, as seen in FIG. 22. The first and second cutting edges 28, 29 are sloping downwards, i.e. towards the reference plane RP as the distance from the first nose cutting edge 17 increases. By such a turning insert, chip breaking is improved in turning with low entering angle. A central part of the top surface 4, i.e. a part of the top surface 4 spaced apart from the periphery is raised in relation to the periphery. By such a turning insert the chip breaking can be further improved in turning because a raised chip breaker can be formed on the top surface 4. A part of the top surface 4 suitable to function as a chip breaker is raised in relation to all the periphery of the top surface 4. A distance from the reference plane RP to the first nose cutting edge 17 is shorter than a distance from the reference plane RP to a part of the top surface 4 spaced apart from the circumferential side surface 6. A distance from the reference plane RP to the first nose cutting edge 17 is greater than a distance from the reference plane RP to a mid-point of the first or second cutting edges 28, 29.

The invention claimed is:

1. A turning tool comprising:

a turning insert and a tool body, the turning insert including opposite facing top and bottom surfaces connected by a circumferential side surface;

a pocket located in the tool body arranged for receiving the turning insert, the pocket including a bottom support surface and first and second pocket side surfaces, the first and second pocket side surfaces forming an acute angle, wherein the first pocket side surface includes first and second side support surfaces, wherein the second pocket side surface includes third and fourth side support surfaces, wherein a first recess is formed between the first and second side support surfaces, wherein a second recess is formed between the third and fourth side support surfaces, and wherein each recess forms a gap between the circumferential side surface and the respective pocket side surfaces, wherein the turning insert is 180 degree symmetrical or indexable in relation to a central axis thereof, wherein the center axis intersects the top and bottom surfaces, wherein the turning insert includes two opposite nose cutting edges, wherein in a top view the turning insert extends a first distance between said nose cutting edges, and extends a second distance perpendicular to the first distance, and wherein the first distance is greater than the second distance; and a coupling portion, wherein the coupling portion extends along a coupling axis, the coupling axis defining a longitudinal axis of the turning tool, and wherein a line between the two opposite nose cutting edges forms an angle of 35-55° in relation to the coupling axis, wherein the coupling portion extends along a coupling axis the coupling axis, wherein a distance from the first pocket side surface to the coupling axis is shorter than a distance from the second pocket side surface to the coupling axis, wherein a distance from the coupling portion to the first side support surface is shorter than a distance from the coupling portion to the second side support surface, wherein a distance from the coupling portion to the third side support surface is shorter than a distance from the coupling portion to the fourth side support surface, and wherein the third side support surface is in top view convexly curved by a radius of curvature which is smaller than the radius of curvature of the fourth side support surface.

2. The turning tool according to claim 1, wherein at least two of the side support surfaces are convex.

3. The turning tool according to claim 1, wherein the turning insert includes first and second nose portions, wherein the first nose portion includes the first nose cutting edge, wherein the second nose portion includes the second nose cutting edge, and wherein each nose portion forms an acute nose angle.

4. The turning tool according to claim 1, wherein a line coinciding with the second distance divides the turning insert into a front half and a rear half, and wherein only the circumferential side surface of the rear half of the turning insert is in contact with the tool body.

5. The turning tool according to claim 1, wherein the turning insert includes a central bore, wherein the central bore opens into the top and bottom surfaces between the two opposite nose cutting edges, and wherein the central bore is symmetrical around a center axis.

6. The turning tool according to claim 5, wherein in a top view a part of the central bore is between two side support surfaces.

7. The turning tool according to claim 1, wherein each recess is concave in a top view, and wherein the gap is 0.05-0.30 mm.

8. The turning tool according to claim 1, wherein parts of the circumferential side surface of the turning insert which are in contact with the side support surfaces are flat or are convex having a radius of curvature which is greater than 500 mm.

9. The turning tool according to claim 1, further comprising a shim, wherein the shim includes the bottom support surface of the pocket.

10. The turning tool according to claim 1, wherein a reference plane extends mid-way between the top and bottom surfaces, and wherein a distance from the reference plane to the first nose cutting edge is shorter than a distance from the reference plane to a part of the top surface spaced apart from the circumferential side surface.

11. The turning tool according to claim 10, wherein a distance from the reference plane to any cutting edge is shorter than a distance from the reference plane to a part of the top surface spaced apart from the circumferential side surface.

* * * * *